US008789098B2

(12) United States Patent
Wei (10) Patent No.: US 8,789,098 B2
(45) Date of Patent: Jul. 22, 2014

(54) INFORMATION PROCESSING APPARATUS, INFORMATION PROCESSING METHOD AND PROGRAM

(75) Inventor: Yuan Wei, Tokyo (JP)

(73) Assignee: Sony Corporation, Tokyo (JP)

(*) Notice: Subject to any disclaimer, the term of this patent is extended or adjusted under 35 U.S.C. 154(b) by 387 days.

(21) Appl. No.: 12/960,965

(22) Filed: Dec. 6, 2010

(65) Prior Publication Data
US 2011/0145860 A1 Jun. 16, 2011

(30) Foreign Application Priority Data
Dec. 15, 2009 (JP) ................................ P2009-284227

(51) Int. Cl.
*H04N 5/445* (2011.01)
(52) U.S. Cl.
USPC ............... 725/39; 725/40; 725/44; 725/47; 725/50; 725/52; 725/53; 725/61
(58) Field of Classification Search
USPC ........................................ 725/39–46, 50, 53
See application file for complete search history.

(56) References Cited

U.S. PATENT DOCUMENTS

| 5,678,015 | A | * | 10/1997 | Goh | 715/782 |
| 5,805,763 | A | * | 9/1998 | Lawler et al. | 386/296 |
| 6,043,818 | A | * | 3/2000 | Nakano et al. | 715/851 |
| 6,094,237 | A | * | 7/2000 | Hashimoto | 348/731 |
| 6,577,350 | B1 | * | 6/2003 | Proehl et al. | 348/564 |
| 6,910,191 | B2 | * | 6/2005 | Segerberg et al. | 715/830 |
| 6,990,637 | B2 | * | 1/2006 | Anthony et al. | 715/851 |
| 7,373,652 | B1 | * | 5/2008 | Bayrakeri et al. | 725/53 |
| 7,685,619 | B1 | * | 3/2010 | Herz | 725/52 |
| 7,721,312 | B2 | * | 5/2010 | Read | 725/52 |
| 7,840,979 | B2 | * | 11/2010 | Poling et al. | 725/41 |
| 7,979,879 | B2 | * | 7/2011 | Kazama et al. | 725/41 |
| 8,250,614 | B1 | * | 8/2012 | Ellis et al. | 725/87 |
| 2002/0033848 | A1 | * | 3/2002 | Sciammarella et al. | 345/838 |
| 2003/0149988 | A1 | * | 8/2003 | Ellis et al. | 725/87 |
| 2003/0167466 | A1 | * | 9/2003 | Nakamura et al. | 725/39 |
| 2005/0028198 | A1 | * | 2/2005 | Robbins | 725/39 |
| 2005/0097603 | A1 | * | 5/2005 | Kikinis | 725/44 |
| 2005/0097606 | A1 | * | 5/2005 | Scott et al. | 725/52 |
| 2006/0279541 | A1 | * | 12/2006 | Kim et al. | 345/158 |
| 2008/0082998 | A1 | * | 4/2008 | Han | 725/39 |
| 2008/0178217 | A1 | * | 7/2008 | Ohno et al. | 725/39 |

(Continued)

FOREIGN PATENT DOCUMENTS

| JP | 2004-015195 | 1/2004 |
| JP | 2004-356774 | 12/2004 |
| JP | 2009-033234 | 2/2009 |

*Primary Examiner* — An Son P Huynh
(74) *Attorney, Agent, or Firm* — Sherr & Jiang, PLLC (57) ABSTRACT

There is provided an information processing apparatus which includes an acquisition unit acquiring an instruction for selecting content information and related information, a search unit searching for plural pieces of the content information or related information which are related to at least a part of the selected content information or the selected related information, an image data generation unit generating first image data in which the content information is arranged using axes of two attributes of the content information, and second image data in which the content information or the related information is arranged using axes of one or two attributes of the content information or the related information in different directions from the two axes of the first image data, and a display control unit controlling a display screen to transparently overlay and display the first image data and the second image data.

19 Claims, 9 Drawing Sheets

(56) References Cited

U.S. PATENT DOCUMENTS

| | | | |
|---|---|---|---|
| 2008/0235735 A1* | 9/2008 | Wroblewski | 725/47 |
| 2008/0320515 A1* | 12/2008 | Sloo | 725/39 |
| 2009/0165048 A1* | 6/2009 | Nishimura | 725/39 |
| 2009/0300497 A1* | 12/2009 | Billmaier et al. | 715/716 |
| 2010/0153872 A1* | 6/2010 | Ahn et al. | 715/768 |
| 2010/0153885 A1* | 6/2010 | Yates | 715/841 |
| 2010/0262995 A1* | 10/2010 | Woods et al. | 725/40 |

* cited by examiner

| | CHANNEL A | CHANNEL B | CHANNEL C | CHANNEL D |
|---|---|---|---|---|
| 7:00 | NEWS | SCIENCE | PROGRAM GUIDE | SHOPPING |
| 7:15 | WEATHER | SOCIAL PROBLEM | ANIMALS | INSECTS |
| 7:30 | MUSIC | MONDAY'S DRAMA "TOMORROW'S TUESDAY" PERFORMER A PERFORMER B PERFORMER C | SPORTS | SCIENCE |
| 7:45 | | | WEATHER | |
| 8:00 | MARATHON RACE LIVE | MYSTERY OF HIBERNATION | BASEBALL | REPORTING |
| 8:15 | | | | |
| 8:30 | DOCUMENTARY | CINEMA | | GALLERY |
| 8:45 | | | | |

200

202

INFORMATION PROCESSING APPARATUS, INFORMATION PROCESSING METHOD AND PROGRAM

BACKGROUND OF THE INVENTION

1. Field of the Invention

The present invention relates to an information processing apparatus, an information processing method and a program. More specifically, the present invention relates to an information processing apparatus, an information processing method and a program which are used to display image data on a display device.

2. Description of the Related Art

On a display device such as a television, displaying not only contents of programs and the like but also information related to the contents has been widely performed. One example of this technology is to display an electronic program guide (EPG) including information such as program titles, program explanations, broadcast date and time, and broadcast stations. In some cases, a unique process is performed on the information and the result is provided to users. For example, Japanese Patent Application Laid-Open No. 2009-33234 discloses a technology for searching for a program having information same as or similar to at least a part of a selected program and displaying the search result on an electronic program guide.

Further, because high resolution televisions have become widespread these days, the information display ability of a display device has been extremely improved. As a result, more information can be provided to users. For example, Japanese Patent Application Laid-Open No. 2004-15195 discloses a technology for displaying a part of an electronic program guide, except for textual information or the like which needs to be readable, by transparently combining with a broadcasting program.

Further, as an information display method for a display device, there is a method other than a band shape arrangement such as an electronic program guide. For example, Japanese Patent Application Laid-Open No. 2004-356774 discloses a technology for displaying plural icons indicating a type of playable medium and plural icons indicating items of a playable content and aligning those icons so as to cross at the center of the screen.

SUMMARY OF THE INVENTION

However, for example, when a program is selected and detailed information is displayed, one type of electronic program guide in the related art displays the detailed information on the electronic program guide so as to hide the electronic program guide. In this case, the operation is complicated since other parts of information on the electronic program guide may not be viewed while the detailed information is displayed and a user has to return to the electronic program guide once to select another program.

Further, in another type of electronic program guide, detailed information is displayed at a separate area in the upper screen so that the other part of the electronic program guide is not hidden; however, the area for displaying the detailed information is limited and thus only less information may be displayed than the actual information display ability of the display device.

In light of the foregoing, it is desirable to provide a novel and improved information processing apparatus, information processing method and program capable of displaying more information on a display screen without deteriorating visibility and operability.

According to an embodiment of the present invention, there is provided an information processing apparatus which includes an acquisition unit configured to acquire, according to user's operation, an instruction for selecting content information, which is related to plural contents and includes plural attributes, and related information having at least one of the plural attributes, a search unit configured to search for, according to the instruction acquired by the acquisition unit, plural pieces of the content information or related information which are related to at least a part of the selected content information or the selected related information, an image data generation unit configured to generate first image data in which the content information is arranged using axes of two attributes of the content information, and second image data in which the content information or the related information searched for by the search unit is arranged using axes of one or two attributes of the content information or the related information in different directions from the two axes of the first image data, and a display control unit configured to control a display screen to transparently overlay and display the first image data and the second image data generated by the image data generation unit.

According to this configuration, many types of information having various associations can be displayed on a display device at the same time, which is difficult to be achieved by displaying information in a simple two-dimensional arrangement. This allows a sufficient usage of the actual information display ability of the display device.

The image data generation unit may generate the first image data using axes in a long side direction and a short side direction on a substantially rectangular display screen and generates the second image data using axes in diagonal line directions.

The image data generation unit may generate the first image data by arranging the content information in a band-shape using a time axis as one of the axes and generate the second image data by arranging the content information or the related information in a line along the axis direction.

When the acquisition unit acquires an instruction for selecting the content information or the related information arranged in the second image data, the display control unit may scroll the content information or the related information arranged on the second image data.

The image data generation unit may, according to the instruction acquired by the acquisition unit, generate the first image data or the second image data so that the selected content information or the selected related information can be visually distinguished from the other content information or the other related information.

When an instruction for selecting the content information or the related information displayed on the second image data is acquired by the acquisition unit, the search unit may search for plural pieces of the content information or the related information related to at least a part of the content information or the related information selected according to the instruction acquired by the acquisition unit, the image data generation unit may newly generate the second image data based on the content information or the related information searched for by the search unit, and the display control unit may update the display of the display screen with the second image data generated by the image data generation unit.

The information processing apparatus may further include a storage unit configured to store the second image data. The acquisition unit may further acquire an instruction for returning to a previous screen according to user's operation, and the display control unit may update the display of the display screen with the second image data read from the storage unit according to the instruction for returning to a previous screen acquired by the acquisition unit.

The acquisition unit may acquire an instruction for selecting the content information arranged in the first image data, which is transparently viewed though the second image data overlaid thereon in the display screen.

The acquisition unit may acquire the instruction for selecting the content information or the related information arranged in the first image data or the second image data when direction buttons respectively corresponding to the arranged axes are pressed on an operation device that is configured to accept user's button operation.

When the instruction for selecting the content information displayed in the first image data is acquired by the acquisition unit, the display control unit may erase the second image data from the display screen.

According to another embodiment of the present invention, there is provided a information processing method which includes the steps of acquiring, according to user's operation, an instruction for selecting content information, which is related to plural contents and includes plural attributes, and related information having at least one of the plural attributes, searching for, according to the instruction acquired in the step of acquiring, plural pieces of the content information or related information which are related to at least a part of the selected content information or the selected related information, generating first image data in which the content information is arranged using axes of two attributes of the content information, and second image data in which the content information or the related information searched for in the step of searching is arranged using axes of one or two attributes of the content information or the related information in different directions from the two axes of the first image data, and controlling a display screen to transparently overlay and display the first image data and the second image data generated in the step of generating.

According to yet another embodiment of the present invention, there is provided a program that causes a computer to execute the steps of acquiring, according to user's operation, an instruction for selecting content information, which is related to plural contents and includes plural attributes, and related information having at least one of the plural attributes, searching for, according to the instruction acquired in the step of acquiring, plural pieces of the content information or related information which are related to at least a part of the selected content information or the selected related information, generating first image data in which the content information is arranged using axes of two attributes of the content information, and second image data in which the content information or the related information searched for in the step of searching is arranged using axes of one or two attributes of the content information or the related information in different directions from the two axes of the first image data, and controlling a display screen to transparently overlay and display the first image data and the second image data generated in the step of generating.

As described above, according to the present invention, more information can be displayed on a display screen without deteriorating the visibility and operability.

DETAILED DESCRIPTION OF THE EMBODIMENT

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

The explanation will be made in the following order.
1. First embodiment (television receiver)
  1-1. Basic configuration of system according to first embodiment
  1-2. Configuration of television receiver according to first embodiment
  1-3. Electronic program guide display process according to first embodiment
  1-4. Related information display process according to first embodiment
    1-4-1. Related information initial screen display process
    1-4-2. Related information scroll display process
    1-4-3. Related information update display process
    1-4-4. Related information history display process
    1-4-5. Related information display termination process
2. Supplementary explanation 1. First Embodiment 1-1. Basic Configuration of System According to First Embodiment A basic configuration of a system 100 according to a first embodiment of the present invention will be explained with reference to FIG. 1.

Figure 1:
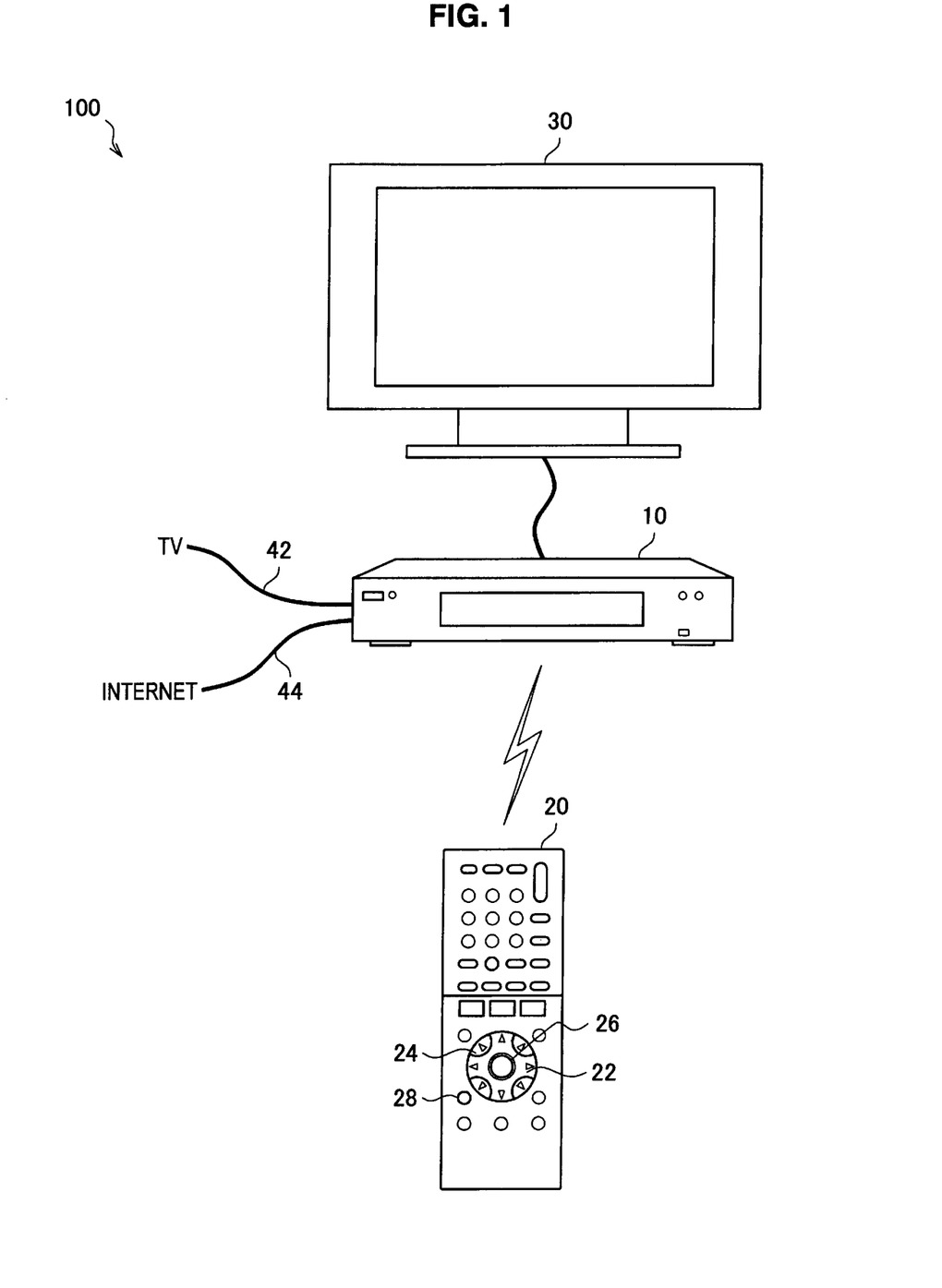
FIG. 1 is a diagram showing a basic configuration of a system according to a first embodiment of the present invention.

The system 100 according to this embodiment includes a television receiver 10, an operation device 20 and a display screen 30.

The television receiver 10 is one example of an information processing apparatus according to this embodiment and receives digital television broadcast. Other examples of the information processing apparatus are a multimedia reproducing apparatus, a personal computer, and the like. The operation device 20 and display screen 30 are connected to the television receiver 10.

The operation device 20 is, for example, a remote controller that has a function to input instruction to the television receiver 10 in response to a user's operation of pressing up/down/right/left direction buttons 22, diagonal direction buttons 24, an enter button 26 and a return button 28.

The display screen 30 is, for example, a display that has a function to display a movie output from the television receiver 10. In this embodiment, a planar shape of the display screen 30 is a substantially rectangular shape, which is a typical shape of a display. In other words, the planar shape of the display screen 30 is an approximately rectangular shape and may be an irregular rectangular shape having round corners, for example.

Further, the television receiver 10 is connected to a television connection line 42, an internet connection line 44 and the like and receives program information and other related information via these lines.

Here, the operation device 20 and display screen 30 are not limited to devices externally connected to the television receiver 10 and may be integrally provided with the television receiver 10 for example. Further, the connections of the television receiver 10 to the operation device 20, the display screen 30, the television connection line 42 and the internet connection line 44 may be wired or wireless connection.

1-2. Configuration of Television Receiver According to First Embodiment

Next, the configuration of the television receiver 10 according to this embodiment will be explained with reference to FIG. 2.

The television receiver 10 includes a CPU (Central Processing Unit) 110 and an HDD (Hard Disk Drive) 120. In addition, the television receiver 10 includes, as hardware for executing a program of a later-described image display processing, a recording device such as a ROM (Read Only Memory) and a RAM (Random Access Memory), a communication device connected to a network such as LAN and the Internet, and a tuner for receiving broadcast signals of digital broadcasting via an antenna wire or the like.

The CPU 110 executes a program to realize functions of an acquisition unit 112, a search unit 114, an image data generation unit 116, and a display control unit 118.

The acquisition unit 112 acquires an instruction from the operation device 20 shown in FIG. 1.

The search unit 114 searches for information via the television connection line 42, the internet connection line 44 and the like.

The image data generation unit 116 generates image data based on the information searched for by the search unit 114.

The display control unit 118 controls the display screen 30 to display the image data generated by the image data generation unit 116 and subjected to a process such as transparentizing.

1-3. Electronic Program Guide Display Process According to First Embodiment

Next, an electronic program guide display process according to this embodiment will be explained with reference to FIGS. 3 and 4.

Figure 3:
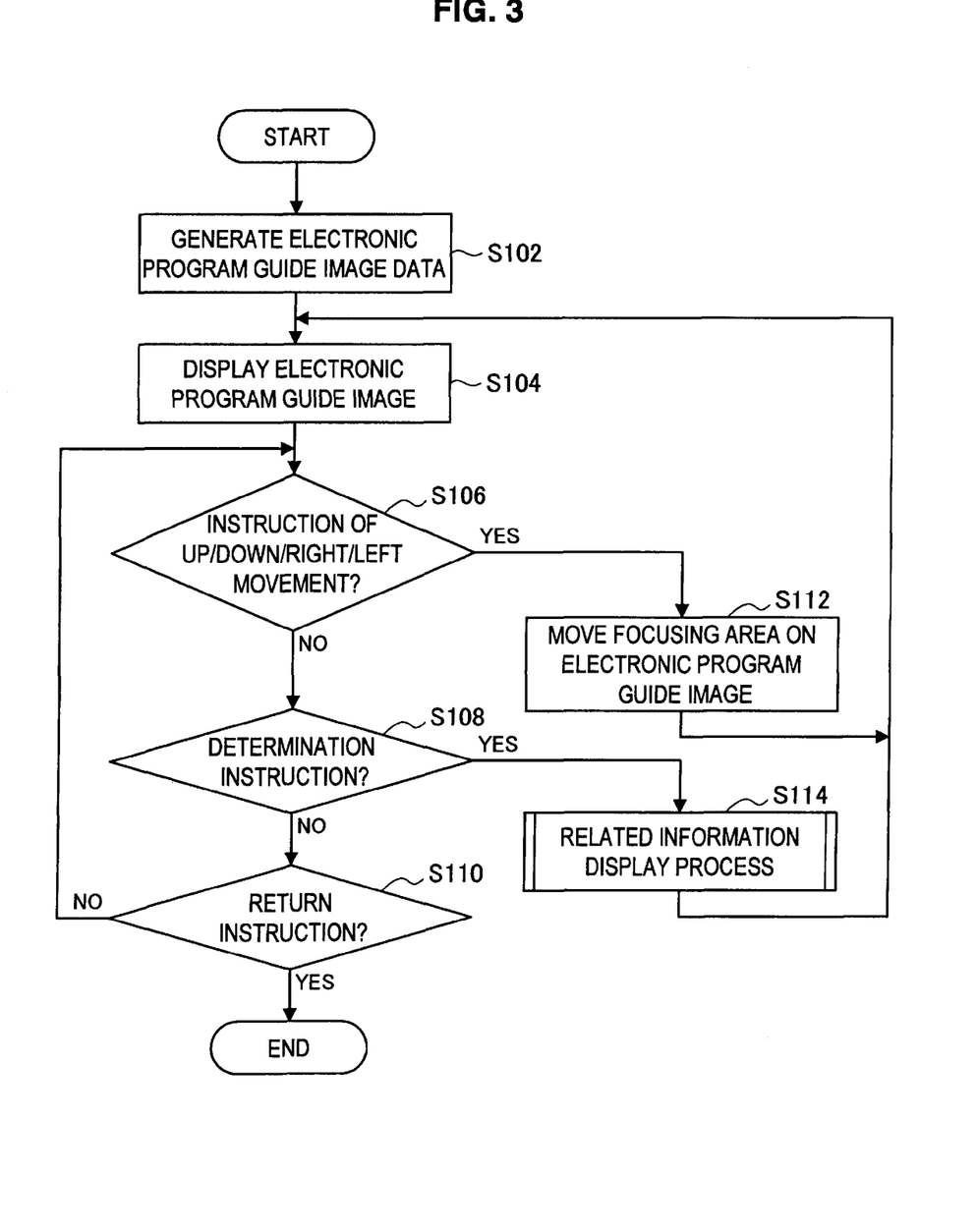
FIG. 3 is a flowchart showing one example of an electronic program guide display process according to the embodiment.

FIG. 3 is a flowchart showing one example of the electronic program guide display process according to this embodiment.

Figure 2:
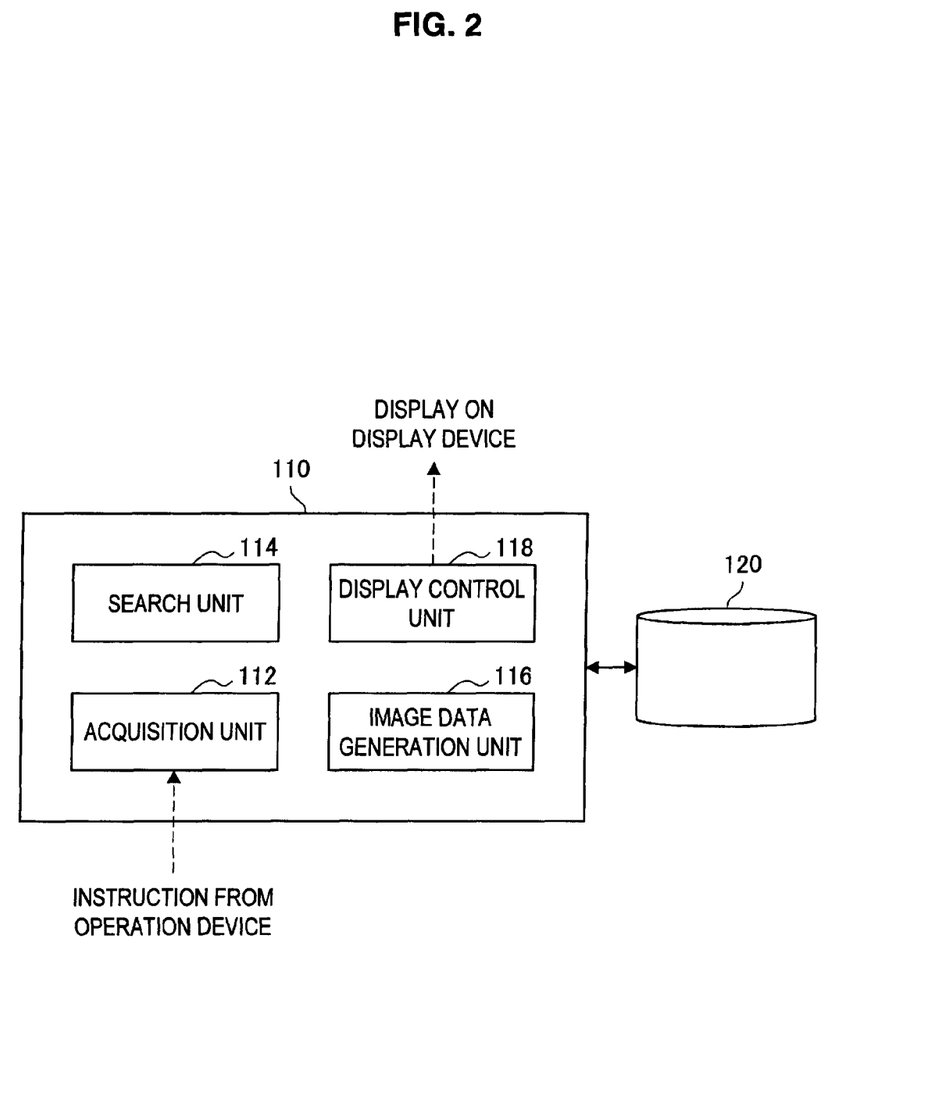
FIG. 2 is a block diagram showing one example of a configuration of a television receiver according to the embodiment.

First, the image data generation unit 116 shown in FIG. 2 generates electronic program guide image data based on program information acquired via the television connection line 42 or internet connection line 44 shown in FIG. 1 (step S102). Next, the display control unit 118 displays an electronic program guide image on the display screen 30 based on the data (step S104).

Figure 4:
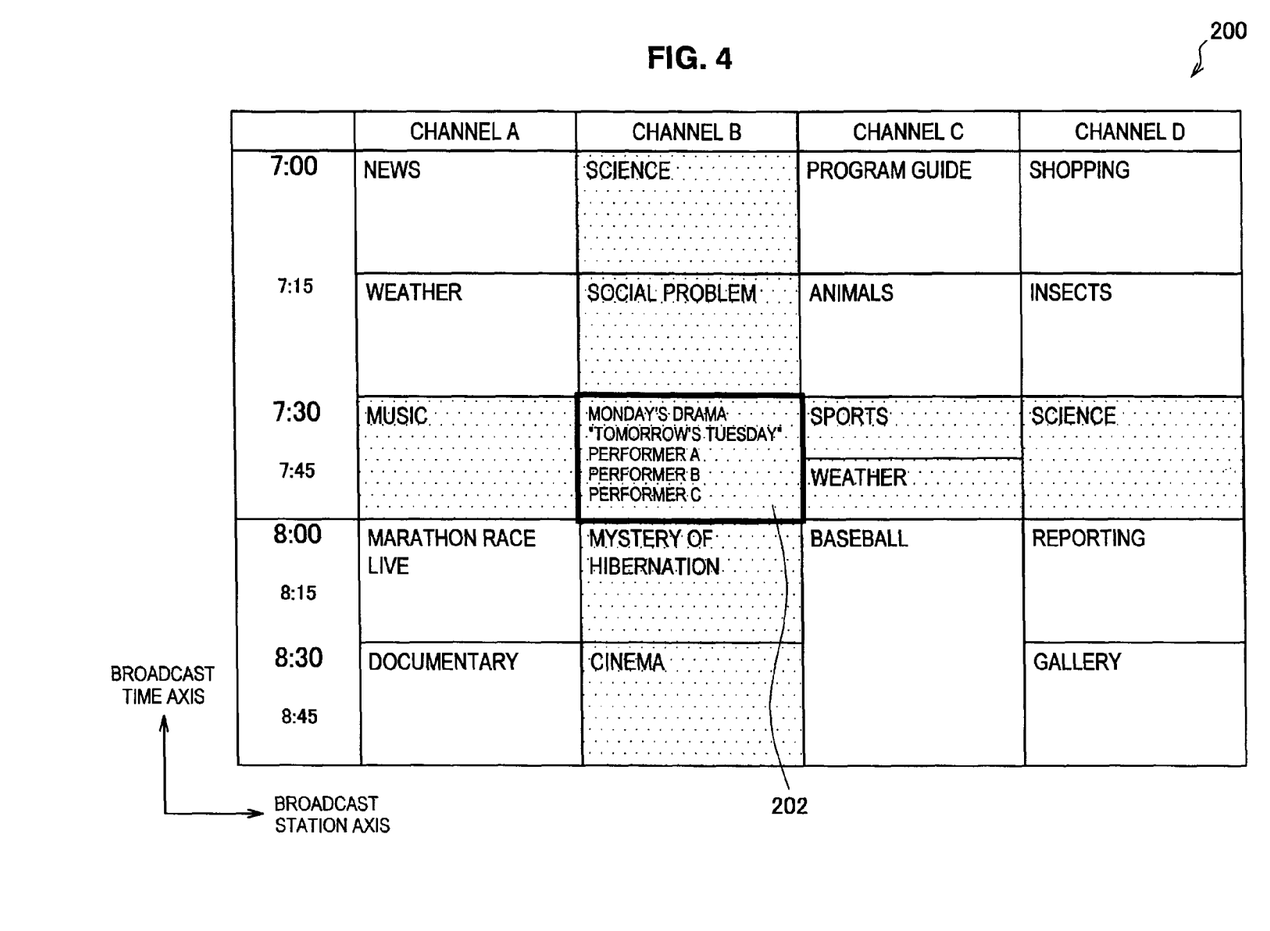
FIG. 4 is a diagram showing one example of a screen of a electronic program guide display according to the embodiment.

As shown in FIG. 4, an electronic program guide image 200 is displayed on the display screen 30.

In the electronic program guide image 200 on the substantially rectangular display screen 30, program information is arranged in a band shape with two axes: a broadcast station axis in a long side direction and a broadcast time axis in a short side direction.

The electronic program guide image 200 according to this embodiment corresponds to first image data in which content information is arranged using axes based on two attributes of the information. In this embodiment, the program information corresponds to the content information and the broadcast station and broadcast time correspond to the two attributes of the content information.

On the electronic program guide image 200, one program at a predetermined position is focused as focused program information 202. Here, the focused program information 202 corresponds to selected content information in this embodiment. The focused program information 202 is displayed with a frame and colored bands in the axis directions including the frame to visually distinguish from other program information.

Here, when a user presses the up/down/right/left direction buttons 22 shown in FIG. 1, the acquisition unit 112 acquires an instruction of up/down/right/left movements (step S106). In this case, the display control unit 118 moves the focused program information 202 on the electronic program guide image 200 in response to the instruction (step S112) and updates the display on the display screen 30 (step S104).

Further, when the user presses the enter button 26, the acquisition unit 112 acquires a determination instruction (step S108). In this case, a related information display process (step S114) is executed. The related information display process (step S114) will be described later.

When the user presses the return button 28, the acquisition unit 112 acquires a return instruction (step S110). This ends the display of the electronic program guide image 200.

1-4. Related Information Display Process According to First Embodiment

Next, the related information display process according to this embodiment will be explained with reference to FIGS. 5 to 9.

Figure 5:
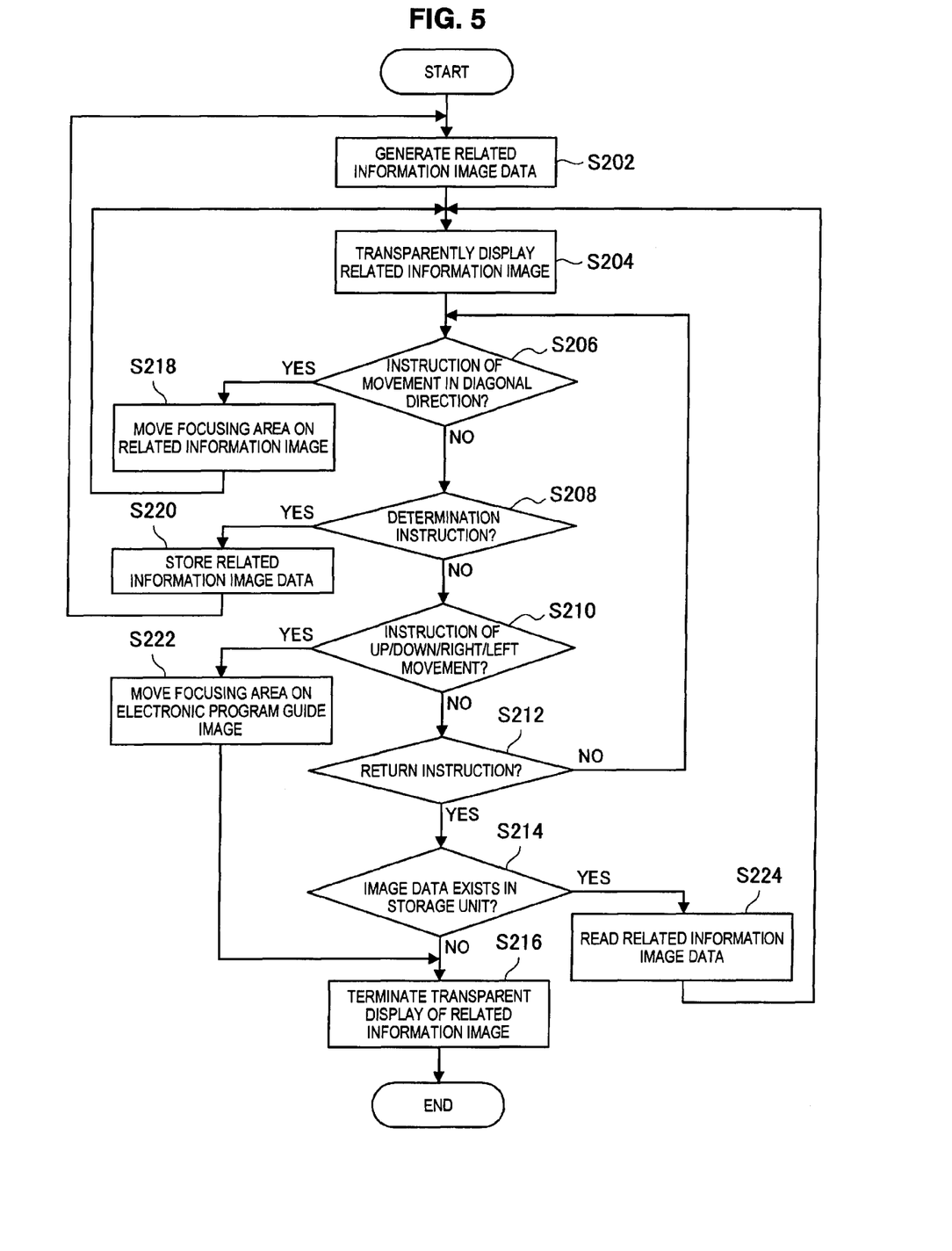
FIG. 5 is a flowchart showing one example of a related information display process according to the embodiment.

FIG. 5 is a flowchart showing one example of the related information display process according to this embodiment.

(1-4-1. Related Information Initial Screen Display Process)

In the related information display process, the search unit 114 firstly searches for information related to the program information selected by the user, according to an instruction acquired by the acquisition unit 112. Next, the image data generation unit 116 generates data of a related information image based on the searched information (step S202).

The information searched for here is content information or related information related to at least a part of plural attributes of the content information selected by a user's operation on the first image data. In this embodiment, the program information corresponds to the content information and the performer information corresponds to the related information. Thus, in this example, in addition to the program information selected by the user's operation on the electronic program guide, program information and performer information related to at least a part of the program information will be searched for.

For example, the search unit 114 searches for performer information as related performer information based on a name of a performer of the program information selected by the user's operation. The search unit 114 also searches for program information which had been broadcasted or will be broadcasted at the same broadcasting hour as the program information, as related program information. The image data generation unit 116 generates data in which the related performer information and related program information are arranged in a form of a later-described related information image.

The display control unit 118 transparently displays the related information image on the display screen 30 based on the generated data (step S204).

Figure 6:
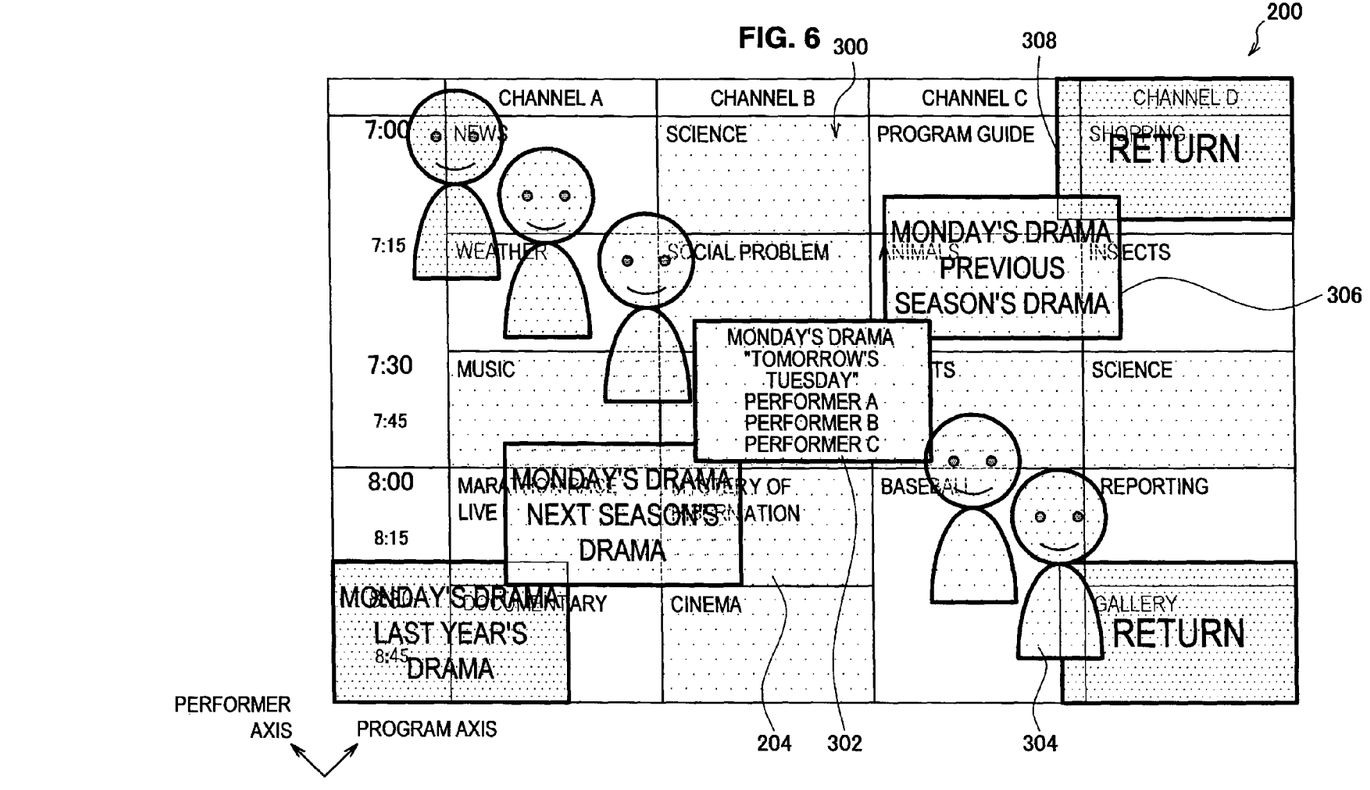
FIG. 6 is a diagram showing one example of a screen of an related information initial display according to the embodiment.

As shown in FIG. 6, on the display screen 30 at this time, the related information image 300 is transparently overlaid on the electronic program guide image 200.

In the related information image 300 on the substantially rectangular display screen 30, pieces of related information are arranged in the directions of the two diagonal lines. A performer axis is set in one of the diagonal directions and a related performer information arrangement 304 of the program is linearly arranged. A program axis is set in the other of the diagonal directions and a related program information arrangement 306 of the program is arranged in a line. The respective arrangements include an icon 308 used to acquire a return instruction.

The related information image 300 of this embodiment corresponds to second image data in which searched content information or related information is arranged using the respective attributes with axes in directions different from the axes of the first image data. In this embodiment, the program information corresponds to the content information and the performer information corresponds to the related information. The performer axis and program axis correspond to axes of attributes of the respective content information and program information and are set in directions different from the axes in the long side direction and the short side direction of the electronic program guide image.

Since the axes of the electronic program guide image 200 and the axes of the related information image 300 are in different directions, the respective pieces of displayed information can be visually recognized at a certain level even when they are transparently overlaid as shown in FIG. 6. Thus, many types of information having various associations can be displayed at the same time by efficiently using the information display ability of the display device.

Here, it may not be necessary to display both of the related performer information arrangement 304 and related program information arrangement 306 in all cases and at least one of them needs to be displayed according to the user's need.

At a center area of the display screen 30 where the diagonal lines cross with each other, focused related information 302 is displayed. To the focused related information 302, the focused program information 202 of the electronic program guide image 200 shown in FIG. 4 is set. In this case, animation in which the focused program information 202 moves to the center area and changed to the focused related information 302 may be displayed.

Here, the related performer information arrangement 304 is an arrangement of information of a performer performing in the program indicated by the focused related information 302 for example. The related program information arrangement 306 is an arrangement of information of a program which had been broadcasted or will be broadcasted in the same broadcasting hour as the program indicated by the focused related information 302 for example.

Figure 7:
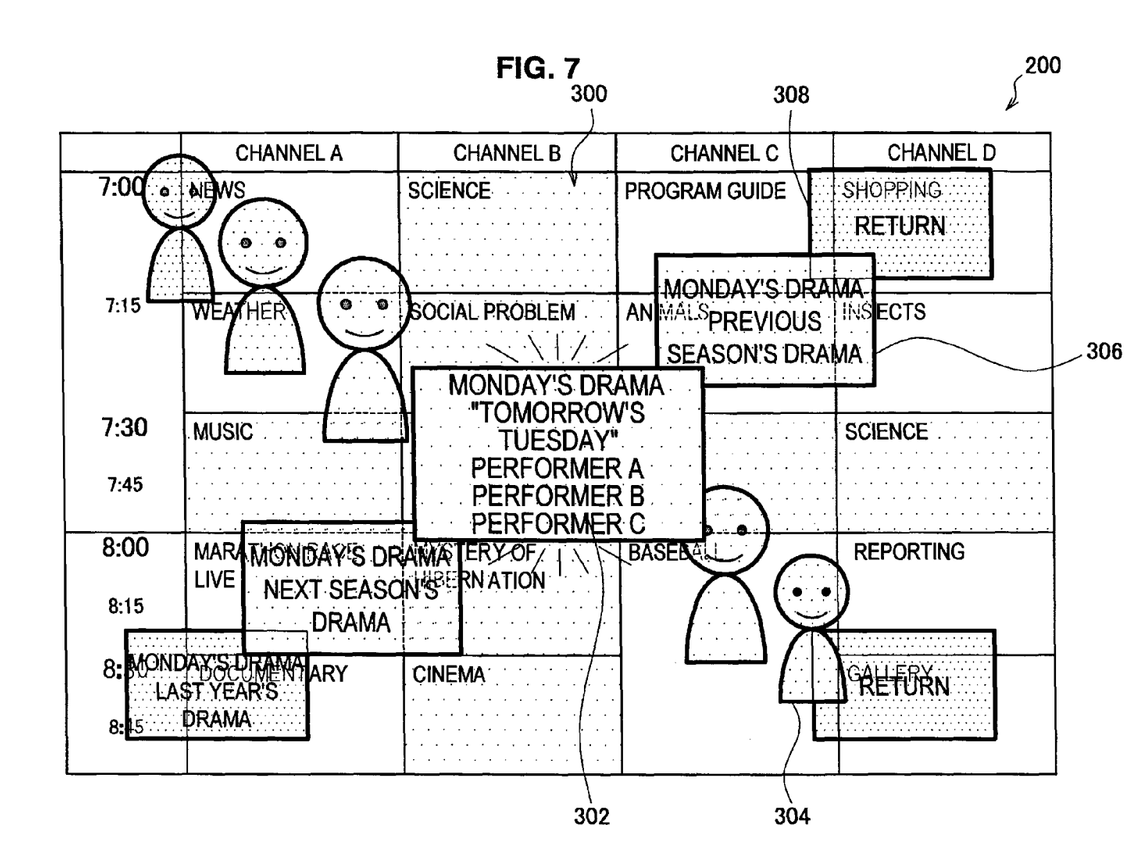
FIG. 7 is a diagram showing one example of a screen of a related information focus display according to the embodiment.

The focused related information 302 is highlighted so as to be visually distinguished from other information, as shown in FIG. 7. A method of highlighting may be changing the size of the display, changing the transparent ratio of the display, changing the color of the display, or blinking the focused related information 302.

Further, the focused related information 302 is displayed at a degree of a transparency ratio which does not affect the visibility of textual information. Thus, in the electronic program guide image 200, it is difficult to completely recognize the program information displayed at background of the focused related information 302.

However, as described above, in the electronic program guide image 200 shown in FIG. 4, the focused program information 202 is displayed with colored bands in the respective axis directions so as to be visually distinguished. Thus, as shown in FIG. 7, even when the focused program information 202 itself is overlaid with the related information image 300 and is not completely recognized, the broadcast time and broadcast station can be seen so that it is possible to realize which part in the electronic program guide image 200 is being focused.

Further, the related performer information arrangement 304 and related program information arrangement 306 are displayed with a higher transparency ratio in stages as placed away from the center of the display screen 30. With this configuration, at an area away from the display screen 30, the program information displayed on the electronic program guide image 200 can be completely recognized.

(1-4-2. Related Information Scroll Display Process)

When the user presses the diagonal direction button 24 shown in FIG. 1, the acquisition unit 112 acquires an instruction of moving in a diagonal direction (step S206). In this case, the display control unit 118 scrolls the related performer information arrangement 304 or related program information arrangement 306 on the related information image 300 in response to the instruction, focuses the information newly placed at the center area (step S218) and updates the display of the display screen 30 (step S204).

Here, the related performer information arrangement 304 and related program information arrangement 306 are displayed using a carousel display system. With this configuration, when the user keeps pressing the diagonal direction button 24, that is, the upper left direction button for example, this allows to view all information included in the related performer information arrangement 304 arranged in the diagonal line including the upper left area.

In this case, when pressing the diagonal direction button 24 for a predetermined period of time or more is set to make a faster scroll movement, this makes the information reference comfortable even when many pieces of information are included in the arrangement.

(1-4-3. Related Information Update Display Process)

When a user presses the enter button 26 shown in FIG. 1 in a condition of focusing information other than the return icons 308, the acquisition unit 112 acquires a determination instruction (step S208).

In this case, the display control unit 118 stores the data of the then displayed related information image 300 in an HDD 120 serving as a storage unit (step S220) and executes a related information image data generating process based on the newly selected information (step S202).

Figure 8:
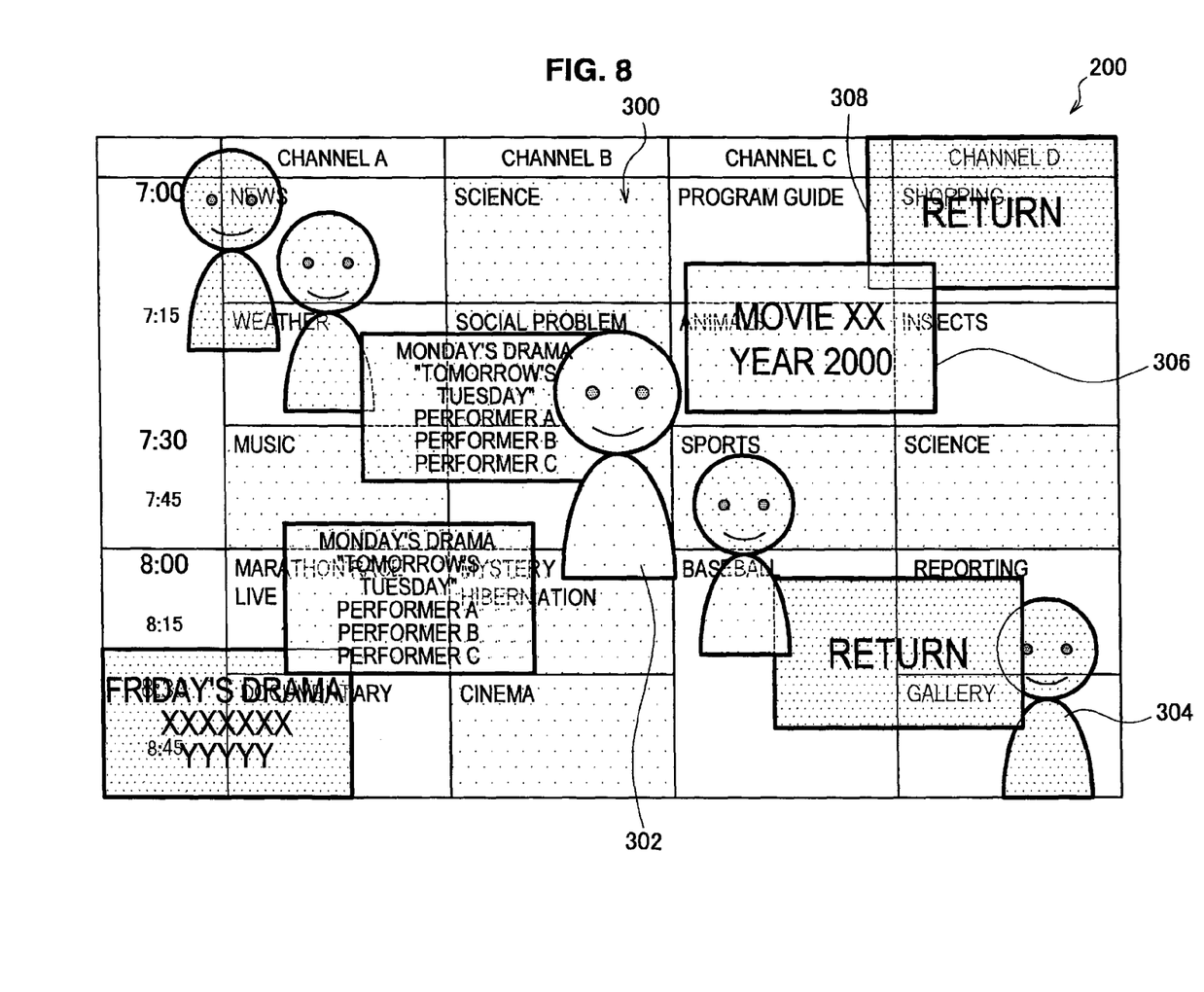
FIG. 8 is a diagram showing one example of a screen of a related information update display according to the embodiment.

FIG. 8 is a diagram showing a condition where the enter button 26 is pressed when the focused related information 302 is performer information. In this case, the related program information arrangement 306 is updated with information of the performer's past program for example and the related performer information arrangement 304 is not changed.

After that, when the enter button 26 is pressed again in a condition where the focused related information 302 is related program information, the related performer information arrangement 304 is updated with the performer information of the program for example. When the enter button 26 is pressed again in a condition where the focused related information 302 is performer information, the related program information arrangement 306 is updated with information of a program in which the performer performs for example. The arrangement will be sequentially updated with new related information in the same manner.

(1-4-4. Related Information History Display Process)

When the user presses the enter button 26 shown in FIG. 1 in a condition where the return icon 308 is focused or when the user presses the return button 28 shown in FIG. 1, the acquisition unit 112 acquires a return instruction (step S212).

In this case, the display control unit 118 checks whether image data of related information image is stored in the storage unit (step S214). When the image data is stored, the data is read (step S224) and the image of the display screen 30 is updated (step S204). When the data is not stored, the display of the related information image 300 is terminated (step S216).

Here, in the related information image 300, the related performer information arrangement 304 or related program information arrangement 306 which is being displayed at that timing returns to a previous condition. In other words, when there is a return instruction just after the related performer information arrangement 304 is updated, the related performer information arrangement 304 is made to be a previous condition and, when there is a return instruction just after the related program information arrangement 306 is updated, the related program information arrangement 306 is made to be a previous condition.

Note that, the "just after" means a period starting from a press of the determination button 26 to a next press of the determination button 26, and the diagonal direction buttons 24 or the like may be pressed during the period for example.

(1-4-5. Related Information Display End Process)

When the user presses the up/down/right/left direction buttons 22 shown in FIG. 1, the acquisition unit 112 acquires an instruction of up/down/right/left movements (step S210). In this case, the display control unit 118 moves the focused program information 202 on the electronic program guide image 200 according to the instruction (step S222) and terminates the display of the related information image 300 (step S216).

For example, such a situation occurs when the user presses the down button of the up/down/right/left direction buttons 22, in a condition where the screen shown in FIG. 6 is displayed, to move the focus to another piece of program information 204 being displayed in the electronic program guide image 200, which is transparently recognized through the related program information.

Figure 9:
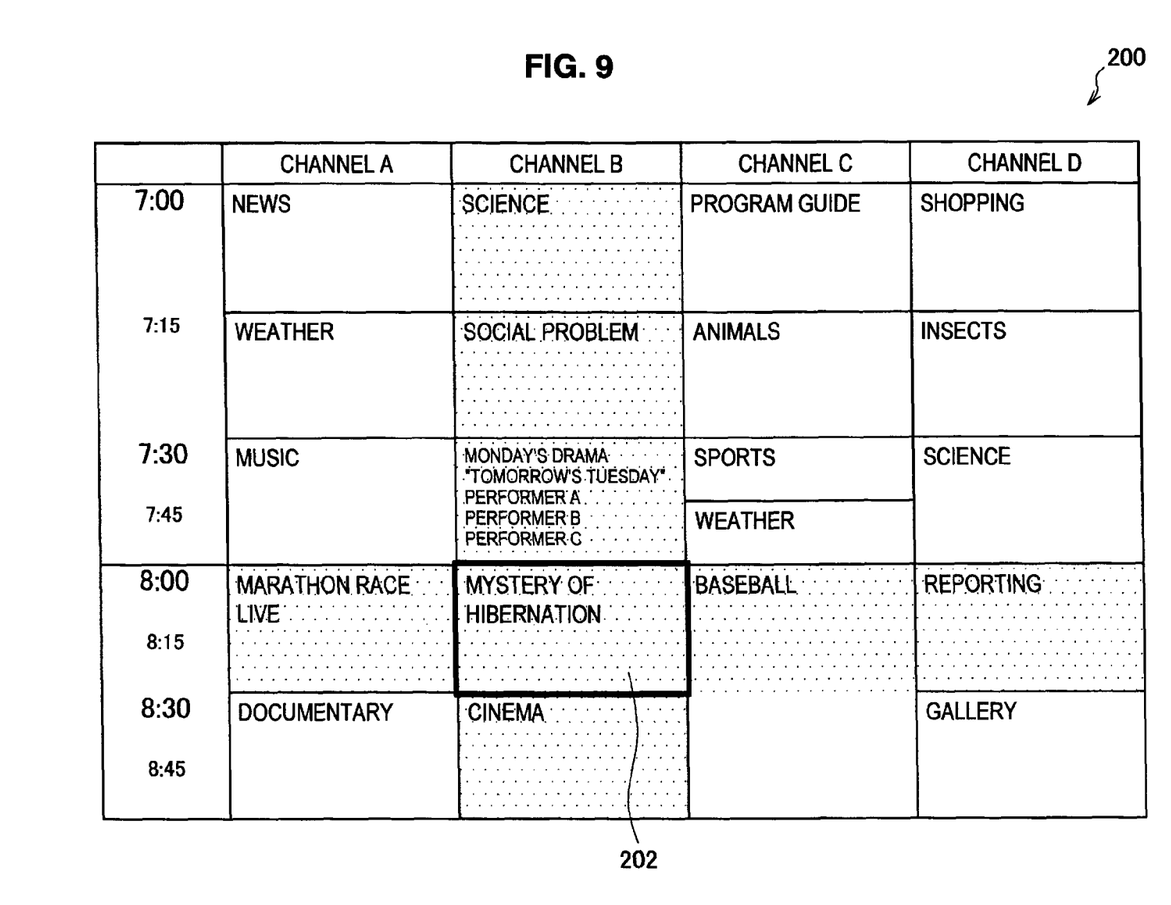
FIG. 9 is a diagram showing one example of a screen after termination of related information display according to the embodiment.

In this case, on the display screen 30, the display of the related information image 300 is terminated and only the electronic program guide image 200 is displayed as shown in FIG. 9, and the another piece of the program information 204 shown in FIG. 6 becomes the new focused program information 202 in FIG. 9.

Here, in the operation device 20 of a type shown in FIG. 1, since the up/down/right/left direction buttons 22 and diagonal direction buttons 24 are adjacent to each other, the user may press the up/down/right/left direction buttons 22 by mistake. In such a case, in order to prevent the case where the display of the related information image 300 is terminated against the user's will, the press of the up/down/right/left direction buttons 22 while the related information image 300 is displayed may be acquired as an instruction to move the focus to the program information 204 only when the up/down/right/left direction buttons 22 are kept pressed for a predetermined period of time or repeatedly pressed predetermined times.

When a return instruction is received just after the related information image 300 is displayed, the display of the related information image 300 is terminated and returns to a condition where only the electronic program guide image 200 is displayed. In this case, the focused program information 202 does not move.

2. Supplementary Explanation

It should be understood by those skilled in the art that various modifications, combinations, sub-combinations and alterations may occur depending on design requirements and other factors insofar as they are within the scope of the appended claims or the equivalents thereof.

For example, the above embodiment of the present invention is applied to a television receiver to search for and display related information of an electronic program guide and a program; however, the present invention is not limited to this example. For example, the present invention may be applied to a multimedia reproducing apparatus or the like. In such a case, when the contents of a program and the like which are searched for as related information are stored in the apparatus or available via the internet connection line, the contents may be reproduced by further selecting operation to those content information. Further, when already-selected performer information that is selected again, the screen may be switched to another screen to display more detailed information of the performer.

Further, according to the above embodiment, performer information and related program information are displayed as information related to program information; however, the present invention is not limited to this example. For example, a product of a medium other than a television related to the program or information of a program having another element related to the program and the like may be displayed.

Further, according to the above embodiment, the operation device is a remote controller on which the user presses buttons; however, the present invention is not limited to this example. For example, the operation device may be a game controller, a mouse or a keyboard. Furthermore, the operation device may be a touch panel integrally provided with a display screen.

Further, according to the above embodiment, the instruction of selecting program information or the like is executed by two steps of button operations: a movement and a determination; however, the present invention is not limited to this example. For example, when the operation device is a touch panel, the selection instruction may be executed by one step using a user interface on the screen. Alternatively, without a clear determination instruction from the user, when a predetermined period of time has passed after a piece of program information or the like is focused, it may be recognized as a determination instruction and detailed information may be displayed.

Further, according to the above embodiment, the return instruction is made by selecting the return icons on the screen or using the return button of the operation device; however, the present invention is not limited to this example. For example, it may be set that, when the user does not operate for a predetermined period of time, the display of related information image is terminated to return to the display of the electronic program guide image. Further, the operation may be distinguished as: when the return icon at the upper part of the screen is selected, the related information is made to return to a previous condition and, when the return button of the operation device is pressed, the display of the related information or the display of the electronic program guide is terminated.

The present application contains subject matter related to that disclosed in Japanese Priority Patent Application JP 2009-284227 filed in the Japan Patent Office on Dec. 15, 2009, the entire content of which is hereby incorporated by reference.

What is claimed is:

1. An information processing apparatus comprising:
an acquisition unit that acquires, according to user's operation, an instruction for selecting content information, which is related to plural contents and includes plural attributes, and related information having at least one of the plural attributes;
a search unit that searches for, according to the instruction acquired by the acquisition unit, plural pieces of the content information or related information which are related to the selected content information or the selected related information;
an image data generation unit that generates first image data in which the content information is arranged using axes of two attributes of the content information, and second image data in which the content information or the related information searched for by the search unit is arranged using at least two axes of at least two attributes of the content information or the related information in different directions from the two axes of the first image data; and
a display control unit that controls a display screen to transparently overlay and simultaneously display the first image data and the second image data generated by the image data generation unit,
wherein the image data generation unit generates the first image data using axes in a long side direction and a short side direction on a substantially rectangular display screen, the axes in the long side direction and the short side direction are arranged within a first visual planar layer,
wherein the image data generation unit generates the second image data using axes in diagonal line directions, the axes in the diagonal line directions are arranged within a second visual planar layer that is the same as or parallel to the first visual planar layer, and
wherein the second image data contains only the selected content information arranged in the first displayed first image data and content information related to the selected content information arranged in the displayed first image data.

2. The information processing apparatus according to claim 1, wherein the image data generation unit generates the first image data by arranging the content information in a band-shape using a time axis as one of the axes and generates the second image data by arranging the content information or the related information in a line along the axis direction.

3. The information processing apparatus according to claim 2, wherein, when the acquisition unit acquires an instruction for selecting the content information or the related information arranged in the second image data, the display control unit scrolls the content information or the related information arranged on the second image data.

4. The information processing apparatus according to claim 1, wherein the image data generation unit, according to the instruction acquired by the acquisition unit, generates the first image data or the second image data so that the selected content information or the selected related information can be visually distinguished from the other content information or the other related information.

5. The information processing apparatus according to claim 1, wherein, when an instruction for selecting the content information or the related information displayed on the second image data is acquired by the acquisition unit, the search unit searches for plural pieces of the content information or the related information related to at least a part of the content information or the related information selected according to the instruction acquired by the acquisition unit, the image data generation unit newly generates the second image data based on the content information or the related information searched for by the search unit, and the display control unit updates the display of the display screen with the second image data generated by the image data generation unit.

6. The information processing apparatus according to claim 5, further comprising:
a storage unit configured to store the second image data, wherein the acquisition unit further acquires an instruction for returning to a previous screen according to user's operation, and the display control unit updates the display of the display screen with the second image data read from the storage unit according to the instruction for returning to a previous screen acquired by the acquisition unit.

7. The information processing apparatus according to claim 1, wherein the acquisition unit acquires an instruction for selecting the content information arranged in the first image data, which is transparently viewed though the second image data overlaid thereon in the display screen.

8. The information processing apparatus according to claim 7, wherein the acquisition unit acquires the instruction for selecting the content information or the related information arranged in the first image data or the second image data when direction buttons respectively corresponding to the arranged axes are pressed on an operation device that is configured to accept user's button operation.

9. The information processing apparatus according to claim 7, wherein, when the instruction for selecting the content information displayed in the first image data is acquired by the acquisition unit, the display control unit erases the second image data from the display screen.

10. The information processing apparatus according to claim 1, wherein a first portion of the second image data is arranged using a first diagonal axis of a first attribute of the content information or the related information, and a second portion of the second image data is arranged using a second diagonal axis of a second attribute of the content information or the related information.

11. The information processing apparatus according to claim 10, wherein the first portion of the second image data is displayed using a carousel display along the first diagonal axis, and the second portion of the second image data is displayed using a carousel display along the second diagonal axis.

12. The information processing apparatus according to claim 10, wherein the axes in the long side direction and the short side direction, the first diagonal axis, and the second diagonal axis are all separate axes that intersect at a focus.

13. The information processing apparatus according to claim 1, wherein the axes in the long side direction and the short side direction and the at least two axes of the at least two attributes of the content information or the related information are all separate axes that intersect at a focus.

14. The information processing apparatus according to claim 13, wherein a degree of the transparency of the second image data increases as a distance to the focus increases.

15. The information processing apparatus according to claim 13, wherein the focus is located at a center area of the display screen.

16. The information processing apparatus according to claim 13, wherein the focus is located at a selected program information substantially at an intersection of the axes of the two attributes of the content information and the at least two axes of the at least two attributes of the content information or the related information.

17. The information processing apparatus according to claim 1, wherein the first visual planar layer and the second visual planar layer are configured to be in a single plane.

18. An information processing method carried out by a computer, comprising the steps of:
    acquiring, according to user's operation, an instruction for selecting content information, which is related to plural contents and includes plural attributes, and related information having at least one of the plural attributes;
    searching for, according to the instruction acquired in the step of acquiring, plural pieces of the content information or related information which are related to at least a part of the selected content information or the selected related information;
    generating first image data in which the content information is arranged using axes of two attributes of the content information, and second image data in which the content information or the related information searched for in the step of searching is arranged using at least two axes of at least two attributes of the content information or the related information in different directions from the two axes of the first image data; and
    controlling a display screen to transparently overlay and simultaneously display the first image data and the second image data generated in the step of generating,
    wherein generating first image data further comprises generating the first image data using axes in a long side direction and a short side direction on a substantially rectangular display screen, the axes in the long side direction and the short side direction being arranged within a first visual planar layer,
    wherein the second image data is generated using axes in diagonal line directions, the axes in the diagonal line directions being arranged within a second visual planar layer that is the same as or parallel to the first visual planar layer, and
    wherein the second image data contains only the selected content information arranged in the first displayed first image data and content information related to the selected content information arranged in the displayed first image data.

19. A non-transitory, computer-readable medium comprising instructions that cause a computer to execute the steps of:
    acquiring, according to user's operation, an instruction for selecting content information, which is related to plural contents and includes plural attributes, and related information having at least one of the plural attributes;
    searching for, according to the instruction acquired in the step of acquiring, plural pieces of the content information or related information which are related to at least a part of the selected content information or the selected related information;
    generating first image data in which the content information is arranged using axes of two attributes of the content information, and second image data in which the content information or the related information searched for in the step of searching is arranged using at least two axes of at least two attributes of the content information or the related information in different directions from the two axes of the first image data; and
    controlling a display screen to transparently overlay and simultaneously display the first image data and the second image data generated in the step of generating,
    wherein generating first image data further comprises generating the first image data using axes in a long side direction and a short side direction on a substantially rectangular display screen, the axes in the long side direction and the short side direction being arranged within a first visual planar layer,
    wherein the second image data is generated using axes in diagonal line directions, the axes in the diagonal line directions being arranged within a second visual planar layer that is the same as or parallel to the first visual planar layer, and
    wherein the second image data contains only the selected content information arranged in the first displayed first image data and content information related to the selected content information arranged in the displayed first image data.

* * * * *